(12) United States Patent
Ott et al.

(10) Patent No.: US 11,493,118 B2
(45) Date of Patent: Nov. 8, 2022

(54) BALL SCREW DRIVE

(71) Applicant: Schaeffler Technologies AG & Co. KG

(72) Inventors: Philippe Ott, Uttenhoffen (FR);
Raphael Wittmann, Soufflenheim (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 219 days.

(21) Appl. No.: 16/500,962

(22) PCT Filed: Apr. 9, 2018

(86) PCT No.: PCT/DE2018/100317
§ 371 (c)(1),
(2) Date: Oct. 4, 2019

(87) PCT Pub. No.: WO2018/196916
PCT Pub. Date: Nov. 1, 2018

(65) Prior Publication Data
US 2020/0032885 A1    Jan. 30, 2020

(30) Foreign Application Priority Data
Apr. 28, 2017 (DE) .................. 10 2017 109 140.8

(51) Int. Cl.
*F16H 25/22* (2006.01)
(52) U.S. Cl.
CPC ....... *F16H 25/2223* (2013.01); *F16H 25/229* (2013.01); *F16H 25/2214* (2013.01); *F16H 25/2228* (2013.01); *F16H 25/2233* (2013.01)

(58) Field of Classification Search
CPC ............. F16H 25/2223; F16H 25/2228; F16H 25/2214; F16D 2125/40; F16D 2023/123
(Continued)

(56) References Cited

U.S. PATENT DOCUMENTS

| 4,677,869 | A | 7/1987 | Mayfield | |
| 2003/0051569 | A1* | 3/2003 | Kapaan | F16H 25/2223 74/424.85 |

(Continued)

FOREIGN PATENT DOCUMENTS

| DE | 3420758 C2 | 7/1987 | |
| DE | 4229583 A1 * | 3/1994 | ......... F16H 25/2223 |

(Continued)

OTHER PUBLICATIONS

FR 2703122 (Jacques Detraz) Sep. 30, 1994. [online] [retrieved on Sep. 21, 2021]. Retrieved from: ProQuest Dialog. (Year: 1994).*

(Continued)

*Primary Examiner* — Joseph Brown
(74) *Attorney, Agent, or Firm* — Davidson, Davidson & Kappel, LLC

(57) ABSTRACT

A ball screw drive includes two screw drive parts (3, 4), namely a lead screw (3) and a nut (4). The ball screw drive also includes a deflection element (6) for the individual deflection of balls (5) is inserted into a recess (7), formed by one of the screw drive parts (3, 4), such that a gap (16) is formed between the base (15) of the recess (7) and the deflection element (6), and such that lateral contact surfaces (17) of the deflection element (6) which are located next to the recess (7) rest on the screw drive part (3, 4).

17 Claims, 3 Drawing Sheets

(58) Field of Classification Search
USPC .......................................... 74/424.87, 424.85
See application file for complete search history.

(56) References Cited

U.S. PATENT DOCUMENTS

| | | | | |
|---|---|---|---|---|
| 2011/0146436 A1* | 6/2011 | Brown | ................ | F16H 25/2223 |
| | | | | 74/424.82 |
| 2015/0362050 A1* | 12/2015 | Kuo | .................... | F16H 25/2214 |
| | | | | 74/424.85 |
| 2018/0111641 A1 | 4/2018 | Hetzel et al. | | |

FOREIGN PATENT DOCUMENTS

| | | | | | |
|---|---|---|---|---|---|
| DE | 10216136 | A1 | | 10/2003 | |
| DE | 102013207745 | A1 | * | 10/2014 | ......... F16H 25/2223 |
| DE | 102014207196 | A1 | | 3/2015 | |
| DE | 102014213411 | A1 | | 1/2016 | |
| DE | 102015104919 | A1 | | 10/2016 | |
| DE | 102015214856 | A1 | * | 2/2017 | ......... F16H 25/2223 |
| EP | 1490609 | B1 | | 5/2006 | |
| EP | 1674763 | A2 | * | 6/2006 | ......... F16H 25/2214 |
| FR | 2703122 | A1 | * | 9/1994 | ......... F16H 25/2223 |
| JP | S5852359 | | | 4/1983 | |
| WO | WO0165147 | A1 | | 9/2001 | |

OTHER PUBLICATIONS

International Search Report for Corresponding PCT/DE2018/100317.

* cited by examiner

BALL SCREW DRIVE

The present disclosure relates to a ball screw, which is suitable for use in a clutch release system.

BACKGROUND

Such a ball screw is known for example from DE 10 2014 213 411 A1. The known ball screw, which is provided for installation in a release system of a motor vehicle, comprises a spindle with an outer profile and a ball screw nut, i.e. spindle nut, with an inner profile, wherein balls, as rolling bodies, roll between said profiles and the inner profile of the ball screw nut is formed as a gothic profile. Deflection means, which are formed as separate components, are present for deflecting the rolling bodies in the ball screw.

A further clutch release system with a ball screw is disclosed in DE 102 16 136 A1. In this case, ball deflection is realized with the aid of deflection caps.

A ball screw with deflection pieces which is disclosed in EP 1 490 609 B1 is suitable, amongst other things, for use in motor vehicle steering mechanisms. The deflection pieces are manufactured from a thermoplastic plastics material.

In general, a ball screw serves for converting a rotation of a spindle drive part, i.e. either a threaded spindle or a spindle nut, into a linear movement of the other spindle drive part. Depending on the design of a ball screw, conversion of a linear movement into a rotation of one of the spindle drive parts is also possible.

SUMMARY

A ball screw with single deflection is provided, in particular with regard to production-technique aspects, wherein the variation in production parameters under conditions of series production should also be only very small.

In a basic concept, which is known per se, this ball screw comprises two spindle drive parts, namely a threaded spindle and a spindle nut, wherein at least one deflection piece for single deflection of the rolling bodies, i.e. balls of the ball screw, is inserted into one of the spindle drive parts. According to the present disclosure, the deflection piece is inserted into a depression formed in one of the spindle drive parts in such a way that a gap area exists between the base of the depression and the deflection piece, i.e. the deflection piece does not lie on the base of the depression. Instead, the deflection piece lies on the spindle drive part by means of contact faces projecting laterally beyond the depression. The contact faces are surface portions of the deflection piece which are aligned at least virtually parallel to the base of the depression.

The faces, provided by the spindle drive part, on which the contact faces of the deflection piece lie are formed by a track of the spindle drive part for the balls of the screw drive or are adjacent to such a track. It has been shown that, as a result of the deflection piece lying on the track of the spindle drive part or on a surface portion of the spindle drive part which adjoins the track, particularly high mechanical precession can be achieved, in particular with regard to the transfer of balls from the track to the deflection piece. If the deflection piece is connected to the threaded spindle, it is supported on the outer circumference of the threaded spindle. In cases in which the deflection piece is connected to the spindle nut, it is supported on the inner circumference thereof.

To introduce the balls into the deflection piece from the track of the spindle drive part, this deflection piece, in a preferred configuration, has two deflection lugs projecting laterally beyond the depression and extending in the tangential direction of the spindle drive parts. These deflection lugs are integral component parts of the deflection piece. Irrespective of the presence of deflection lugs, the deflection piece can be efficiently manufactured from plastics material in an injection molding method, wherein simple removability from the mold is realized.

According to a possible configuration, the deflection piece inserted into the depression of the one spindle drive part has a top face, i.e. a surface opposite the base of the depression, which is contoured complementarily to the thread of the other spindle drive part. The contouring of the top face is configured in such a way that a gap remains between the top face of the deflection piece and the thread of the other spindle drive part, which thread provides a track for the balls of the screw drive, the width of which gap, as measured in the radial direction of the spindle drive parts, is smaller than the penetration depth of the deflection piece in the depression. It is thus ensured that, as a result of the deflection piece, no friction, or, in conjunction with lubricant, only an extremely low amount of friction, is generated between the spindle drive parts provided the deflection piece is inserted into the depression in the intended manner, i.e. with contact between the contact faces and the spindle drive part. If the deflection piece becomes partially disengaged from the depression, for example as a result of centrifugal forces and/or vibrations, although this results in a slight increase in the friction between the spindle drive parts, complete disengagement of the deflection piece from the depression is prevented so that the function of the deflection piece is maintained. Moreover, as a result of the small dimensions of the gap between the top face of the deflection piece inserted into the one spindle drive part and the helical rolling-body 1 track of the other spindle drive part, a lubricant-retaining, in particular grease-retaining, effect is realized.

According to an advantageous further development, the deflection piece has, in addition to the contact face, a stop face which is aligned orthogonally to the contact face and is provided for cooperation with the other spindle drive part. In this case, a stop is provided in the axial direction between the deflection piece and the other spindle drive part or an element connected to the other spindle drive part. A particularly gentle stop between the spindle drive parts is realized if the deflection piece strikes a seal which is mounted on the other spindle drive part. Irrespective of the point at which the deflection piece connected to one of the spindle drive parts strikes the other spindle drive part or components connected to the other spindle drive part, the ball screw can have an axial stop formed by a deflection piece either at a single end face or at both end faces.

Particularly precise positioning of the deflection piece in the depression of the spindle drive part is facilitated by a groove-shaped recess which is formed between the lateral contact face of the deflection piece and a central portion of the deflection piece, which engages in the depression.

The spindle drive part into which the deflection piece is inserted can be either the threaded spindle or the spindle nut of the ball screw. In both cases, a plurality of single deflections can be arranged in the axial direction of the ball screw, with one deflection piece arranged after another in each case.

BRIEF SUMMARY OF THE DRAWINGS

A plurality of exemplary embodiments of the present disclosure are explained in more detail below with reference to a drawing, which shows.

DETAILED DESCRIPTION

Unless stated otherwise, the following explanations relate to all exemplary embodiments. Mutually corresponding parts or parts which act the same in principle are denoted by the same reference signs in all figures.

Figure 1:
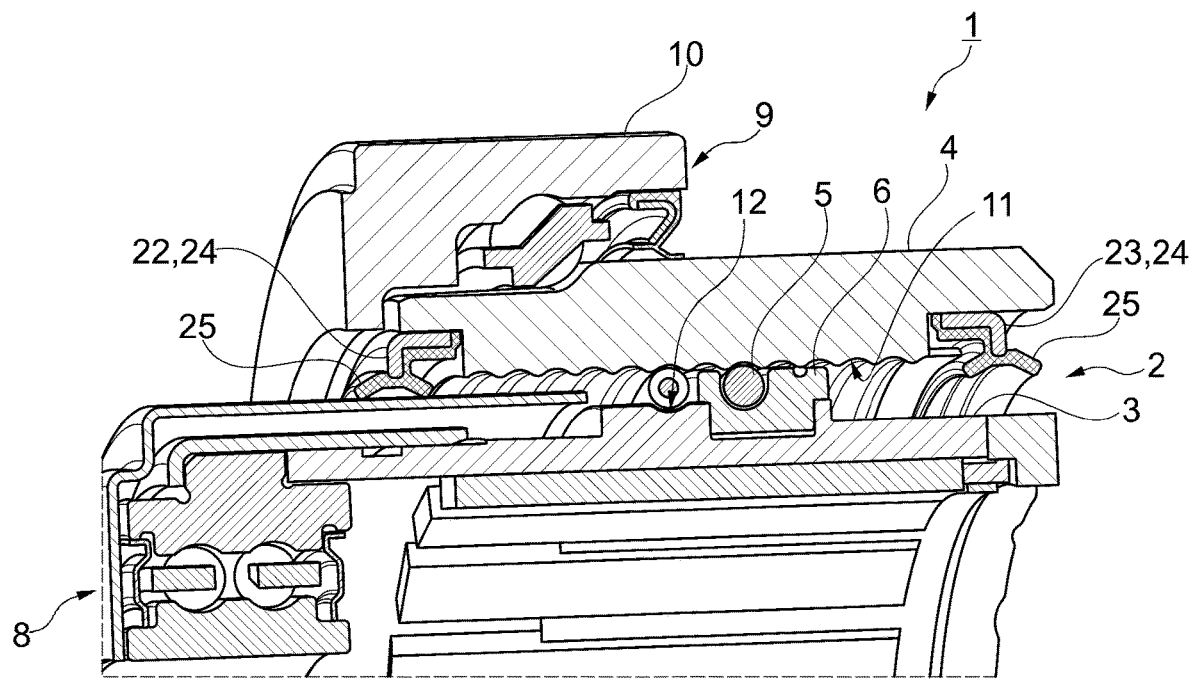
FIG. 1 a ball screw as part of a clutch release system.
Figure 4:
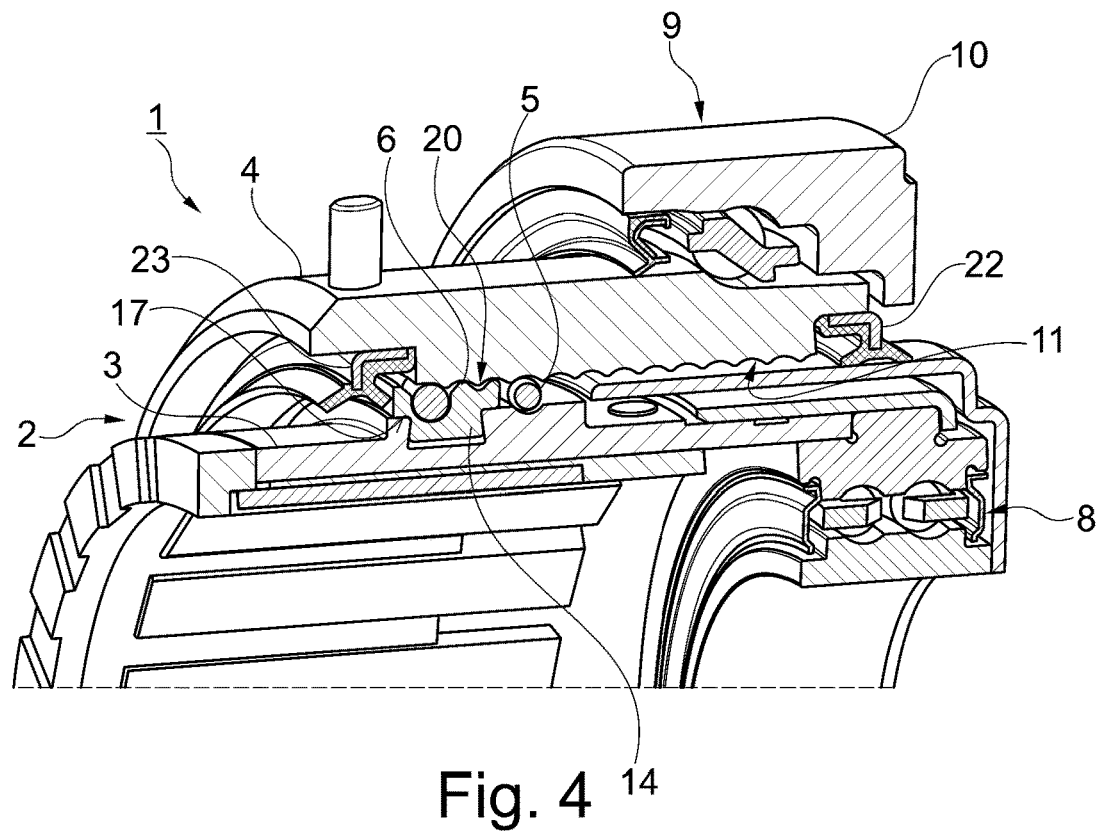
FIG. 4 an alternative configuration of a ball screw.
Figure 5:
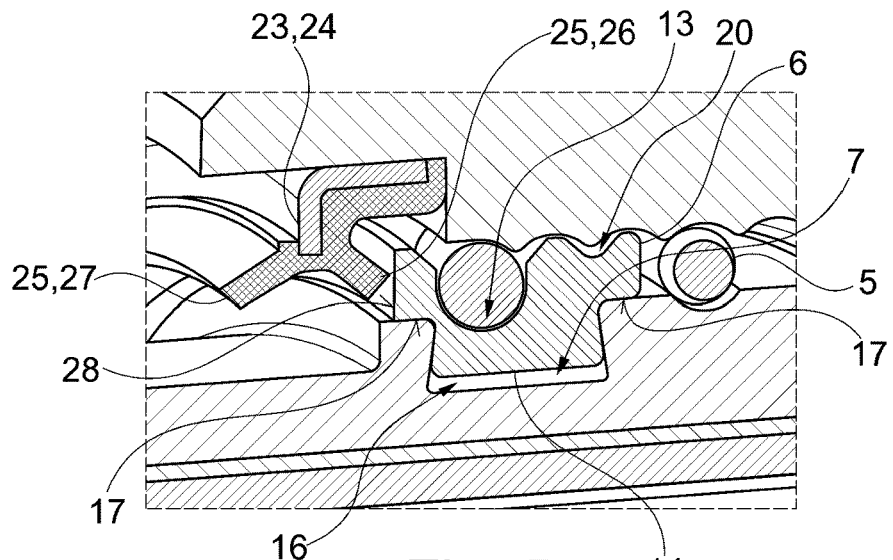
FIG. 5 a detail of the arrangement according to FIG. 4.
Figure 6:
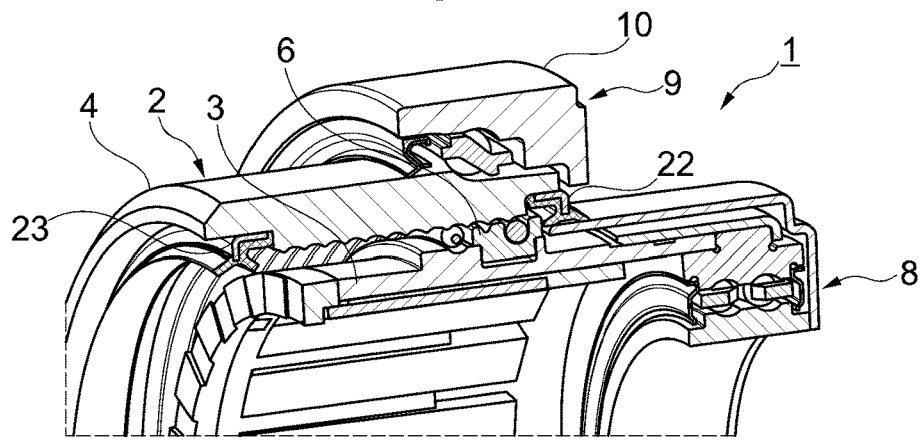
FIG. 6 a further configuration of a ball screw in a clutch release system.
Figure 7:
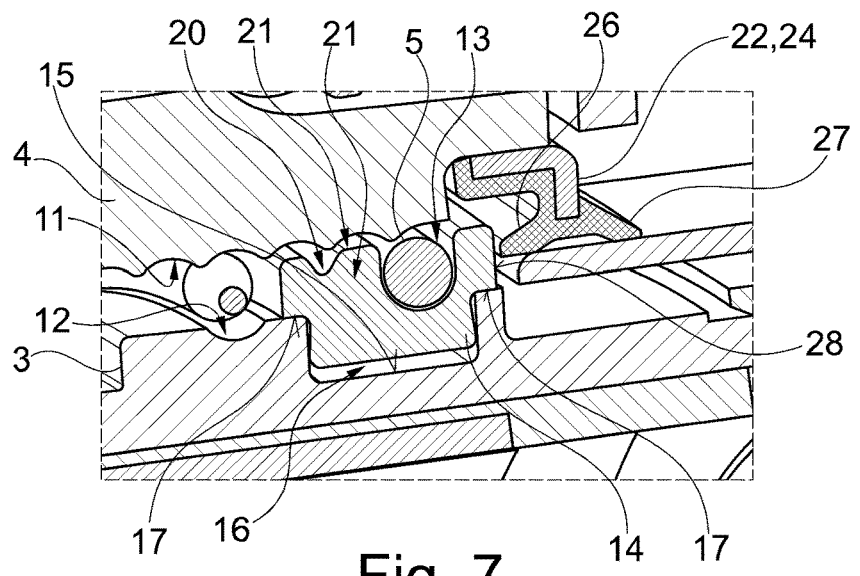
FIG. 7 a detail of the arrangement according to FIG. 6.

A clutch release device 1, which is illustrated in several variants in FIGS. 1, 4 and 6, is configured as a central release unit and can be used in a hybrid module of a motor vehicle. The clutch release device 1 operates using a ball screw 2, which comprises two spindle drive parts 3, 4, namely a threaded spindle 3 and a spindle nut 4. Balls, as rolling bodies 5, roll between the spindle drive parts 3, 4. The ball screw 2 is configured as a screw drive with single deflection, wherein, for the deflection of the balls 5, a deflection piece 6 is provided which is inserted into a depression 7 in the outer circumference of the threaded spindle 3. The threaded spindle 3 is rotatably mounted with the aid of a rolling bearing 8, which is constructed as a two-row ball bearing. The spindle nut 4 is displaceable on the threaded spindle 3 in a torsion-resistant manner. The spindle nut 4 in turn forms a component of a clutch release bearing 9, which, in a manner known in principle, is constructed as an angular ball bearing. The rotatable outer ring, denoted by 10, of the clutch release bearing 9 is provided for actuation of a plate spring of a friction clutch.

The rolling bodies 5 of the ball screw 2 roll along a track 12 of the threaded spindle 3 and a track 11 of the spindle nut 4. The track 12 is interrupted by the deflection piece 6, wherein the balls 5, with the aid of the deflection piece 6, are diverted from the track 11 of the spindle nut 4 and introduced back into it one winding further. When passing through the deflection piece 6, the balls 5 are not only deflected in the axial direction of the ball screw 2 but, to a correspondingly small extent, are also directed radially inward, i.e. in the direction of the rotational axis of the threaded spindle 3. The deflection piece 6 is a single-piece plastics part which is produced in an injection molding method.

A radially outwardly open deflection channel 13 can be seen within the deflection piece 6, which deflection channel is formed in a central portion, denoted by 14, of the deflection piece 6. The central portion 14 is that portion of the deflection piece 6 which engages in the depression 7. However, the central portion 14 does not lie on the base, denoted by 15, of the depression 7. Instead, a gap area 16 is formed between the underside of the central portion 14 and the base 15, the width of which gap, as measured in the radial direction of the ball screw 2, is denoted by Sp. T denotes the penetration depth of the deflection piece 6 in the depression 7, as measured in the same direction. The penetration depth T is a multiple of the gap width Sp.

Figure 2:
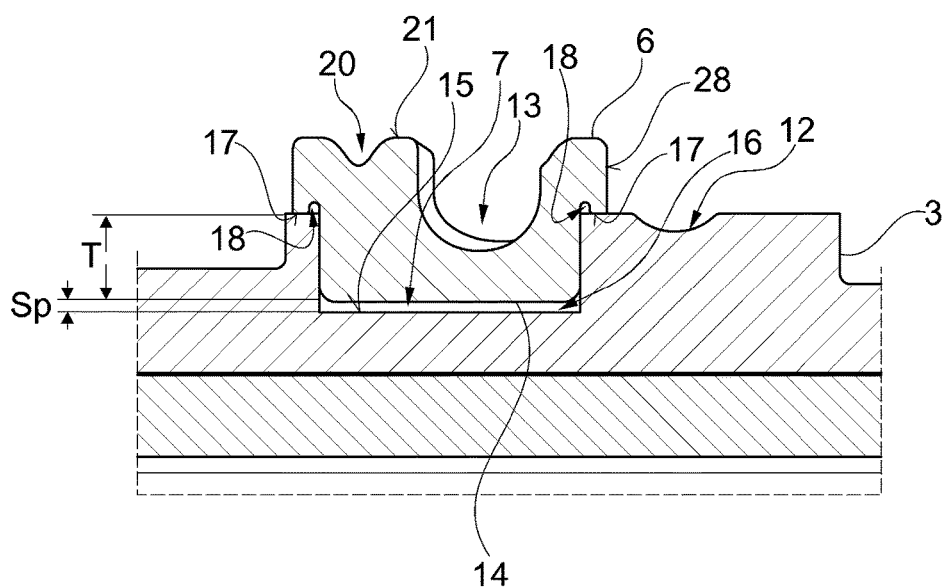
FIGS. 2 and 3 details of the arrangement according to FIG. 1.

The deflection piece 6 projects laterally beyond the depression 7 in such a way that lateral contact faces 17 are formed, which lie on the threaded spindle 3. The positioning of the deflection piece 6 in the radial direction is precisely defined by the contact of the contact faces 17 and the threaded spindle 3. This precise positioning ensures in particular that the balls 5 do not have to pass through a step in the transition between the track 12 and the deflection channel 13. 18 denotes groove-shaped recesses which are formed at the transitions between the central portion 14 and the lateral contact faces 17. The groove-shaped recesses 18 can only be seen in the detailed view according to FIG. 2, but are also present in the other embodiments.

Figure 3:
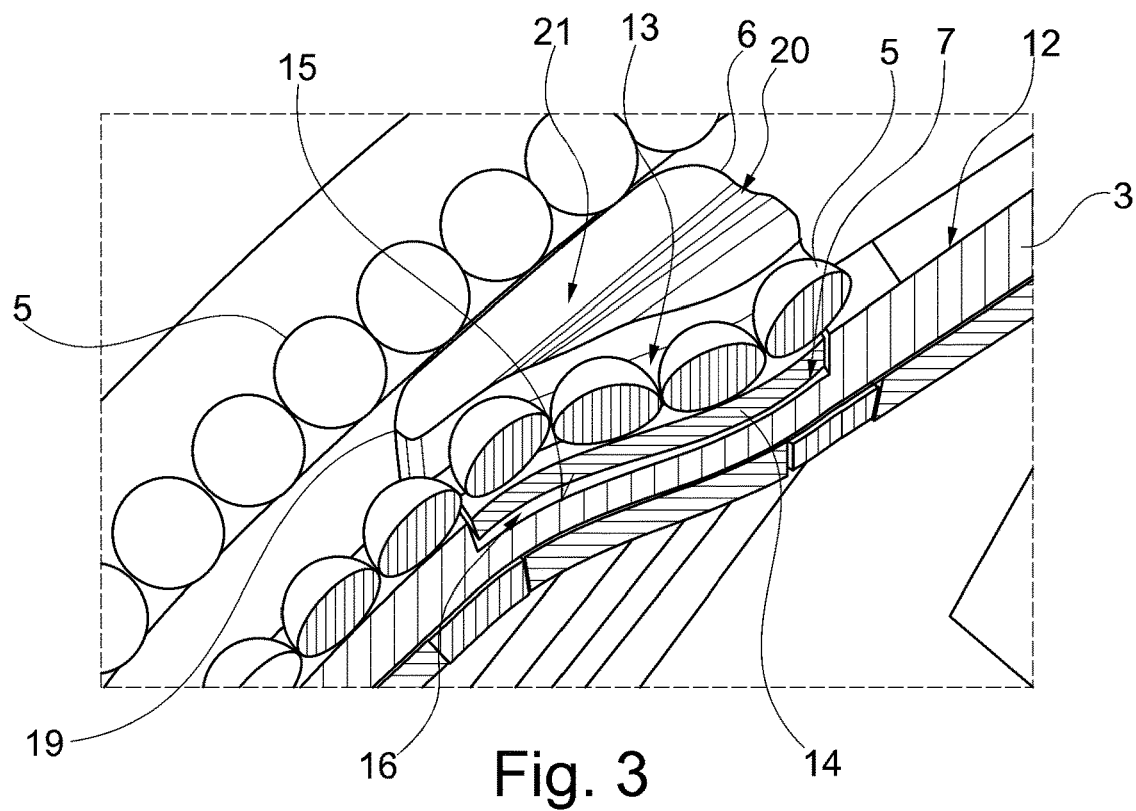

The same applies for a deflection lug 19, which can be seen in FIG. 3 and plays a role in the transfer of the balls 5 from the track 12 into the deflection channel 13. The deflection lugs 19, which are present twice on each deflection piece 6, project far beyond the depression 7 in the tangential direction of the track 12 and ensure a gentle transfer of the balls 5 from the track 12 into the deflection channel 13 with low acceleration forces.

A groove structure 20 can be seen on the upper side, facing the spindle nut 4, of the deflection piece 6, which groove structure is part of a top face, denoted by 21, of the deflection piece 6. The groove structure 20 adjacent to the deflection channel 13 is formed complementarily to the helically winding track 11 of the spindle nut 4. A gap exists between the top face 21 and the spindle nut 4, so that the deflection piece 6 can move relative to the spindle nut 4 with practically no friction effects. The width of said gap, as measured in the radial direction of the spindle drive parts 3, 4, is substantially smaller than the penetration depth T.

During the intended operation of the ball screw 2, lubricant, in particular grease, is located between the threaded spindle 3 and the spindle nut 4, wherein sealing between the spindle drive parts 3, 4 is realized by seals 22, 23. The seals 22, 23 each have a metal core 24, which is connected to an elastomer element 25. Two sealing lips 26, 27 are formed by the elastomer element 25.

In the constructions according to FIG. 1 and FIG. 4, the ball screw 2 is configured in such a way that the deflection piece 6 can strike the seal 23, which is located on that end face of the spindle nut 4 which is remote from the outer ring 10 of the clutch release bearing 9. In this case, a stop face 28 of the deflection piece 6 contacts the sealing lip 26, i.e. a portion of the elastomer element 25.

Analogously, in the construction according to FIG. 6, an axial stop of the ball screw 2 is provided in the form of a contact between the axial stop face 28 of the deflection piece 6 and the seal 22. Protection against over-rotation is already provided during the assembly of the ball screw 2 by the axial stop function of the deflection piece 6 in conjunction with the spindle nut 4, wherein balls 5 are in particular prevented from falling out.

LIST OF REFERENCE SIGNS

1 Clutch release device
2 Ball screw
3 Threaded spindle
4 Spindle nut
5 Rolling body, ball
6 Deflection piece
7 Depression
8 Rolling bearing
9 Clutch release bearing
10 Outer ring
11 Track of the spindle nut
12 Track of the threaded spindle
13 Deflection channel
14 Central portion
15 Base
16 Gap area 17 Contact face
18 Groove-shaped recess
19 Deflection lug
20 Groove structure
21 Top face
22 Seal
23 Seal
24 Metal core
25 Elastomer element
26 Sealing lip
27 Sealing lip
28 Stop face
Sp Gap width
T Penetration depth

What is claimed is:

1. A ball screw comprising:
two spindle drive parts, the two spindle drive parts being a threaded spindle and a spindle nut;
a deflection piece for a single deflection of balls, the deflection piece inserted into a depression formed by a first of the two spindle drive parts in such a way that a gap area is formed between a base of the depression and the deflection piece and the deflection piece lies on the first of the two spindle drive parts by lateral contact faces near to the depression,
wherein the gap area is formed between the base of the depression and a central portion of the deflection piece such that no portion of the deflection piece lies on the base,
wherein the spindle nut includes a helically winding track for receiving the balls, wherein the deflection piece includes a first deflection lug and a second deflection lug both projecting outside of the depression and away from the depression, a top face of the first deflection lug being shaped differently than a top face of the second deflection lug and including a groove structure formed complementarily to the helically winding track.

2. The ball screw as claimed in claim 1, wherein the first and second deflection lugs extend in a tangential direction of the two spindle drive parts.

3. The ball screw as claimed in claim 1, wherein the top face of the first deflection lug is formed complementarily to a thread of the helically winding track.

4. The ball screw as claimed in claim 3, wherein a gap is formed between the top face of the first deflection lug and the thread of the helically winding track, a width of the gap, as measured in a radial direction of the two spindle drive parts, being smaller than a penetration depth of the deflection piece in the depression.

5. The ball screw as claimed in claim 1, wherein a stop face of the deflection piece, which is aligned orthogonally to the lateral contact faces of the deflection piece, is formed as an axial stop face provided for cooperation with the second of the two spindle drive parts,
wherein the stop face is provided for cooperation with a seal held on the second of the two spindle drive parts.

6. The ball screw as claimed in claim 1, wherein the deflection piece includes a groove-shaped recess formed between one of the lateral contact faces and a central portion of the deflection piece, the central portion of the deflection piece engaging in the depression.

7. The ball screw as claimed in claim 6, wherein the groove-shaped recess is positioned outside of the depression.

8. The ball screw as claimed in claim 1, wherein the deflection piece is inserted into the threaded spindle.

9. The ball screw as claimed in claim 8, wherein a center axis of the ball screw defines a radial direction, the lateral contact faces being further in the radial direction away from the center axis than a track of the threaded spindle.

10. The ball screw as claimed in claim 1, wherein the second deflection lug includes a stop face of the deflection piece, which is aligned orthogonally to the lateral contact faces of the deflection piece, formed as an axial stop face provided for cooperation with a second of the two spindle drive parts.

11. The ball screw as claimed in claim 1, wherein the deflection piece includes a radially outwardly open deflection channel configured to deflect the balls in an axial direction of the ball screw and to direct the balls radially inward toward a rotational axis of the threaded spindle.

12. The ball screw as claimed in claim 1, wherein the depression is defined by the base and surfaces extending radially from the base to the lateral contact faces of the first of the two spindle drive parts.

13. A ball screw comprising:
two spindle drive parts, the two spindle drive parts being a threaded spindle and a spindle nut, the threaded spindle including lateral contact faces and a depression recessed away from the lateral contact faces;
balls radially between the threaded spindle and the spindle nut; and
a deflection piece for deflecting the balls inserted into the depression in such a way that a gap area is formed between a base of the depression and the deflection piece and the deflection piece contacts the lateral contact faces,
wherein the gap area is formed between the base of the depression and a central portion of the deflection piece such that no portion of the deflection piece lies on the base,
wherein the spindle nut includes a helically winding track for receiving the balls, wherein the deflection piece includes a first deflection lug and a second deflection lug both projecting outside of the depression and away from the depression, a top face of the first deflection lug being shaped differently than a top face of the second deflection lug and including a groove structure formed complementarily to the helically winding track.

14. The ball screw as recited in claim 13,
wherein the groove structure is alignable with respect to the helically winding track such that the balls are transferable from the helically winding track to the groove structure of the deflection piece.

15. The ball screw as recited in claim 14, wherein the helically winding track is interrupted by the deflection piece such that the balls are diverted via the deflection piece from the helically winding track and introduced back into the helically winding track one winding further.

16. The ball screw as claimed in claim 13, wherein a center axis of the ball screw defines a radial direction, the lateral contact faces being further in the radial direction away from the center axis than a track of the threaded spindle.

17. The ball screw as claimed in claim 13, wherein the depression is defined by the base and surfaces extending radially from the base to the lateral contact faces of the threaded spindle.

* * * * *